US006516453B1

(12) United States Patent
Knapp

(10) Patent No.: US 6,516,453 B1
(45) Date of Patent: Feb. 4, 2003

(54) METHOD FOR TIMING ANALYSIS DURING AUTOMATIC SCHEDULING OF OPERATIONS IN THE HIGH-LEVEL SYNTHESIS OF DIGITAL SYSTEMS

(75) Inventor: David Knapp, San Jose, CA (US)

(73) Assignee: Get2Chip, San Jose, CA (US)

( * ) Notice: Subject to any disclaimer, the term of this patent is extended or adjusted under 35 U.S.C. 154(b) by 0 days.

(21) Appl. No.: 09/574,572

(22) Filed: May 17, 2000

Related U.S. Application Data

(60) Provisional application No. 60/135,902, filed on May 26, 1999.

(51) Int. Cl.$^7$ .............................................. H06F 17/50
(52) U.S. Cl. ........................... 716/6; 364/489; 364/490; 364/491; 395/558
(58) Field of Search ............................... 716/6, 8, 1–21

(56) References Cited

U.S. PATENT DOCUMENTS

| | | | | |
|---|---|---|---|---|
| 5,237,514 A | * | 8/1993 | Curtin ........................ | 364/490 |
| 5,282,148 A | * | 1/1994 | Poirot et al. ................ | 364/491 |
| 5,426,591 A | * | 6/1995 | Ginetti et al. ............... | 364/489 |
| 5,432,707 A | * | 7/1995 | Leung ........................ | 364/489 |
| 5,448,497 A | * | 9/1995 | Ashar et al. ................ | 364/489 |
| 5,459,673 A | * | 10/1995 | Carmean et al. ............ | 364/489 |
| 5,602,754 A | * | 2/1997 | Beatty et al. ............... | 364/489 |
| 5,726,902 A | * | 3/1998 | Mahmood et al. .......... | 364/489 |
| 5,740,067 A | * | 4/1998 | Hathaway ................... | 364/489 |
| 5,778,216 A | * | 7/1998 | Venkatesh .................. | 395/558 |
| 5,831,869 A | * | 11/1998 | Ellis et al. .................. | 364/489 |
| 5,880,971 A | * | 3/1999 | Dangelo et al. ............ | 364/489 |
| 5,894,421 A | * | 4/1999 | Yamaguchi et al. ........ | 364/490 |

* cited by examiner

Primary Examiner—Matthew Smith
Assistant Examiner—Andrea Liu
(74) Attorney, Agent, or Firm—Michael A. Glenn; Kirk D. Wong

(57) ABSTRACT

A design-timing-determination process for an electronic design automation system approximates the timing of a whole design quickly and on-the-fly. Such allows a scheduling system to construct operation schedules that are ultimately realizable. A timing analysis is applied each time an individual operation is scheduled, and may be called many times to get a single operation scheduled. A graph representing combinational logic is partitioned into a collection of logic trees with nodes that represent gates and terminals, and arcs that represent connections. A compacted model of each logic tree is constructed by replacing them with equivalent trees having no interior nodes. The timing of the original circuit is analyzed along each path from the leaves to the roots. A propagation delay for each path is determined, and such is annotated onto each corresponding arc of the simplified tree. Any dependency of the propagation delay in the original circuit on the slew rate of their input signals is annotated onto the corresponding leaf of the simplified tree. Capacitive loads can also be copied from the logic-tree leaves and annotated on the simplified-tree leaves. Any load/delay response curves of the output gate at the apex of the logic tree and is copied to the root of the simplified tree. The entire delay calculation is collapsed into a simple edge-weighted longest-path traversal, and is much simpler than trying to compute the slew rates and delays for each cell in a circuit.

3 Claims, 4 Drawing Sheets

METHOD FOR TIMING ANALYSIS DURING AUTOMATIC SCHEDULING OF OPERATIONS IN THE HIGH-LEVEL SYNTHESIS OF DIGITAL SYSTEMS

This application claims benefit to U.S. provisional application serial No. 60/135,902, filed May 26, 1999.

BACKGROUND OF THE PRESENT INVENTION

1. Technical Field

The present invention relates to electronic design automation and more particularly to timing analysis during automatic scheduling of operations in the high-level synthesis of digital systems.

2. Description of the Prior Art

High-level synthesis (HLS) automates certain subtasks of a digital system design in an electronic design automation (EDA) system. A system architect begins by designing and validating an overall algorithm to be implemented, e.g., using C, C++, a specialized language, or a capture system. The resulting architectural specification is partitioned into boards, chips, and blocks. Each block is a single process having its own control flow. There are usually tens to hundreds of such blocks in a modem large-scale chip design. Typical blocks represent whole filters, queues, pipeline stages, etc. Once a chip has been partitioned into its constituent blocks, any needed communication protocols have to be constructed. Such protocols depend on cycle-by-cycle communication between blocks.

So-called "scheduling" and "allocation" are applied one block at a time. Scheduling assigns operations such as additions and multiplications to states of a finite-state machine (FSM). Such FSM describes a control flow in an algorithm performed by a block being synthesized. Some operations are locked into particular states, and represent communication with other blocks. These input/output operations cannot be moved, or rescheduled, from one state to another, because to do so would probably upset the block-to-block communication protocol.

However, some other operations can be moved from one state to another. Moving operations from states that have many operations to states that have few allows hardware resources to be more evenly shared among operations. Timing problems can sometimes be resolved by moving certain operations from states in which operation delays cause timing problems into states in which such problems don't exist.

Allocation maps the operations of a scheduled FSM to particular hardware resources. For example, three addition operations can be scheduled to only require a single adder. An appropriate adder is constructed, and the operations are assigned to the adder. But complications can arise when more than one hardware resource of a given bit-width and function is needed. And so which resource to use for each operation must be decided. Considerations include multiplexing cost, the creation of false timing paths, register assignment, and even using a large resources for small operations. Hardware resources can be used for multiple functions. Calculating a minimum set of resources for an entire process is difficult but rewarding. Sometimes alternative implementations will be possible. It is often possible to choose implementations that meet the overall timing constraints and minimize the gate count. Resource allocation also includes mapping resources (abstract functions) to gate level implementations.

Allocation includes calculating a register set and assigning data to registers for use in later states. For example, temporary variables are used to store intermediate results in a larger calculation. But the contents of such temporary variables could share a common register in different states. The contents are only needed in one state each. So it is possible to save on hardware by assigning the data that needs to be stored to such storage elements. But register and storage allocations can be complicated if data values can form mutually exclusive sets or can share storage. Data values often drive functional resources, and in turn are often produced by functional resources. A good assignment of data to storage will result in reduced multiplexing costs and delays. The allocation is also made more complex if any register and functional hardware interact.

Technology-independent, or Boolean, optimization follows scheduling and allocation. The circuit design comprises generic AND and OR gates connected in a netlist. Technology-independent optimization minimizes the number of literals in the netlist. An abstraction of Boolean gates lends itself to a highly mathematical treatment based on Boolean arithmetic. For example, the Boolean identity AB+AC=A(B+C) can be used to reduce the corresponding gate network.

Technology mapping follows Boolean optimization, the abstract Boolean gates of the circuit are mapped to standard cells from a technology library. Standard library cells include simple AND, OR, or NOT functions, and much more complex functions. For example, full adders, and-or-invert gates, and multiplexers. Technology-library gates are available in a variety of drive strengths, delays, input loadings, etc. Technology mapping is made more complex by the fact that there are many ways to map an individual Boolean gate, and each way having its own unique advantages.

Technology mapping can sometimes be avoided by constructing custom gate layouts for the gates of a circuit, instead of selecting cells from a library of preconstructed and precharacterized cells. But this method is not commonly associated with automatic synthesis.

The layout tasks of cell placement and net routing follow technology mapping, the physical position of each cell on the chip is established (placement), and the nets necessary to interconnect the cells are laid out (routing). In application service provider 104, the design intellectual property is downloaded to the user for placing and routing.

The usual input for an HLS system is a VHDL or Verilog process. Single conceptual units are represented with single threads of control, well-defined input and output operations, and a well-defined sequences of operations that define behavior. The output of the typical HLS system includes three interlinked parts and its input behavior. First, a finite-state machine (FSM) comprising a finite set of states "S", an alphabet of input symbols "I", an alphabet of output symbols "O", and a transition function "F" mapping (S×I)->(S×O). This is the so-called Mealy representation of an FSM. Another common representation, the Moore representation, is logically equivalent. Second, a resource graph, comprising a collection of hardware resources, which are abstract representations of registers and combinational logic elements, and interconnections between the resources. Third, a mapping of the process's operations and data values to the states and alphabets of the FSM and to the resources. This mapping can be thought of either as two mappings. E.g., operations and data to the FSM, and operations and data values to resources. Or as a single ternary mapping whose tuples are of the form operation, symbol, resource, or value, state, resource. Each three-tuple of the ternary mapping can be thought of as describing a linkage between an operation or data value, a state or transition of the FSM, and a register or combinational resource. In other words, what, when, and where.

Event control statements like "@ (posedge clock)" in Verilog directly map to corresponding states in the FSM. The control flow between event control statements maps directly to state transitions, or "arcs". Statements like "c=a+b" that occur along a control flow between two event control statements can be mapped onto corresponding FSM arcs, e.g., as operation annotations. HLS systems effectively take Verilog fragments and a technology library as input, and extract a skeleton FSM of states and arcs. Then it extracts the operations and links them to the FSM. The HLS system constructs a resource set, e.g., registers to contain the values, adders, comparators, etc. The HLS system can then construct tuples that describe the what-when-where linkage between the operations, the FSM, and the resources. For example, the Verilog fragment:

input [7:0] a, b;
output [7:0] c;
always begin: process reg [7:0] x, y;
  @ (posedge clock);// s1
  if (x>y) begin
    c=a+b
  end else begin
    @ (posedge clock); // s2
  end
end will result in three tuples being constructed: (1) a tuple containing the addition "c=a+b", an ac from s1 to itself, and an adder, (2) a tuple containing the data value "a", a state s1, and a register r1, and (3) a tuple containing the data value "b", a state s1, and a register r2.

The HLS system uses the original description and such tuples to interconnect the resources. In the example, register r1's output must drive one input of the adder, and the adder must drive an output port "c". Once the FSM has been completely described and the resources connected together, the design can be output.

Downstream tools can then be used for state assignment on the states of the FSM. Such tools construct the next-state and output logic of the FSM, optimize the logic associated with the FSM and the resources, technology-map the circuit, do place and route, do test insertion, and even power analysis.

HLS systems accept a process as input. They output an FSM, a resource graph, and a table of relationships that describes what is happening during each state or transition, and where it is happening. If the input description contains more than one process, each process can be scheduled independently. If the description contains other logic, the other logic can be passed through to back-end tools without being changed.

In the simple example given herein, an HLS system cannot do any significant optimization. However in more complex designs, there will be opportunities to improve the original design. For example, if there were more states and more additions, it might be possible to distribute the additions among the states so that only one adder would be needed. And if the data values "x" and "y" were not permanent, their registers r1 and r2 could be used to store other data values in different states.

Scheduling is an optimizing transformation that assigns operations to states and transitions of a FSM. When operations are assigned to transitions, the underlying FSM is a "Mealy" machine. In the prior art, the problem in scheduling is one of assigning operations to abstract c-steps, which represent single clock cycles, without specifying whether states or transitions are the ultimate target.

The value of scheduling can be seen in the following example. Consider a process having ten states. Assume that in the first state, twenty-one data values are present on the process's inputs. The design must sum up the twenty-one data values and deliver the result to an output variable in the tenth state. Assuming two-argument addition operations, twenty additions need to be made in the ten states available. These operations can be assigned to transitions in any of a number of ways. For a minimum number of adders, two additions per transition makes sense. But, to minimize storage, all of the data should b e summed in the first transition, and then use one register to store the sum over the remaining nine states. If the inputs are stable over more than one state, the summation can be done during those states to minimize both storage and the number of adders needed.

The scheduling problem is made more complex if the state graph is not linear. State graphs normally include branches, loops, and alternate flows. The operations to be scheduled are seldom homogeneous, the operations can be different types and bit-widths. Data arrival times can vary across the output bits of a resource, and it must be possible to do the scheduled operations on one transition within a single clock cycle.

If there is a conditional control-flow branch, the condition bit computation must settle in time to set up the inputs of the state bits of the FSM. If the branching transitions include operations, the condition bit computation must settle even earlier to enable those operations to complete before cycle end. The aggregate timing of a collection of operations needs to be accommodated, because an operation "0" scheduled in transition "T" consumes data that is produced by other operations also scheduled in "T". A computation "x=a+b+c" might be scheduled in a single transition. In one design, a first addition determines "a+b", and a second operation adds that sum for output "c".

When two or more operations with a data dependency are scheduled in the same transition, the operations are "chained". As a practical matter, chaining cannot be avoided in HLS systems because there are always data and control dependencies. In a data dependency, the result of one operation is directly consumed by another. In a control dependency, needing to do one operation depends on the result of another, as in:

if (a<b) begin
  x=y +
end

In this case, the addition operation need not be done unless "a" is less than "b". So doing the addition at all depends on the result of the comparison.

An HLS system constructs a map of operations and data values to hardware resources, together with the timing constructs. The allocation task constructs the resources and the mapping of the operations and data to the resources. Allocation comprises operator and register allocation. Operator allocation maps the operations to combinational hardware, register allocation maps the data values to registers. A first step includes deciding on what hardware to allocate, e.g., how many adders and registers, and of what bit widths. A second step assigns particular operations and data values to identified resources after the resources have been constructed.

Allocation can be done before, during, or after scheduling. A suitable candidate set of combinational resources can be constructed before scheduling. These resources should represent an adequate set to implement the entire design. It is possible to do operation assignment during scheduling, so a realistic assessment of the timing of a chain of operations can be made when a chain is committed. This will practically guarantee that the corresponding combinational concatenation of resources will run at the desired speed.

SUMMARY OF THE PRESENT INVENTION

Briefly, a design-timing-determination method embodiment of the present invention for an electronic design automation system approximates the timing of a whole design quickly and on-the-fly. Such allows a scheduling system to construct operation schedules that are ultimately realizable. A timing analysis is applied each time an individual operation is scheduled, and may be called many times to get a single operation scheduled. A graph representing combinational logic is partitioned into a collection of logic trees with nodes that represent gates and terminals, and arcs that represent connections. A compacted model of each logic tree is constructed by replacing them with equivalent trees having no interior nodes. The timing of the original circuit is analyzed along each path from the leaves to the roots. A propagation delay for each path is determined, and such is annotated onto each corresponding arc of the simplified tree. Any dependency of the propagation delay in the original circuit on the slew rate of their input signals is annotated onto the corresponding leaf of the simplified tree. Capacitive loads can also be copied from the logic-tree leaves and annotated on the simplified-tree leaves. Any load/delay response curves of the output gate at the apex of the logic tree and is copied to the root of the simplified tree. The entire delay calculation is collapsed into a simple edge-weighted longest-path traversal, and is much simpler than trying to compute the slew rates and delays for each cell in a circuit.

DETAILED DESCRIPTION OF THE PRESENT INVENTION

Figure 1:
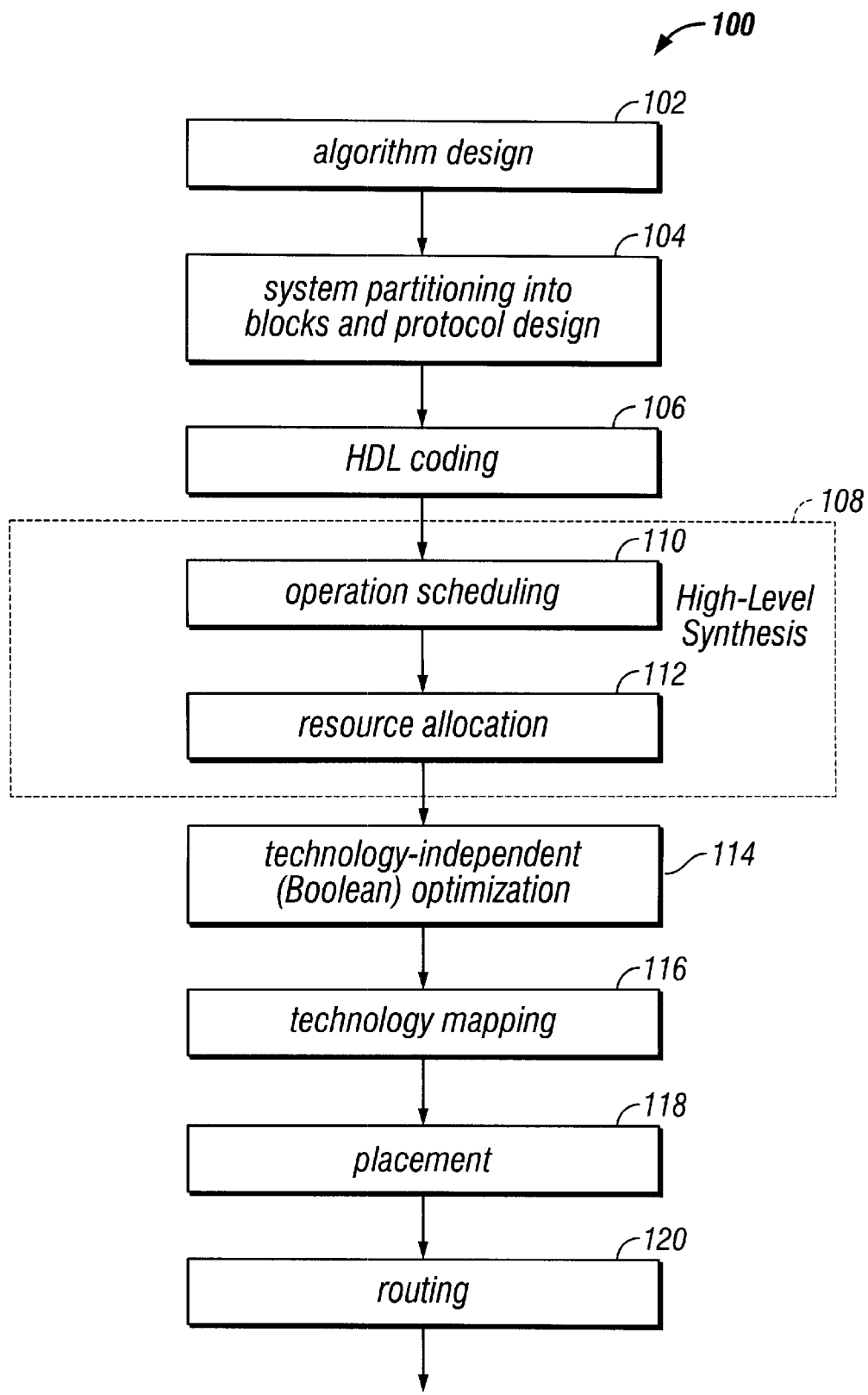
FIG. 1 is a flowchart diagram of a electronic design automation (EDA) method embodiment of the present invention.

FIG. 1 represents an electronic design automation (EDA) method embodiment of the present invention, and is referred to herein by the general reference numeral 100. The EDA method begins with an algorithm design step 102. The system design is partitioned into blocks and protocol design in a step 104. Verilog or other kind of hardware description language (HDL) coding is done in a step 106. A high-level synthesis (HLS) step 108 includes an operation scheduling step 110 and a resource allocation step 112. A timing analysis is applied each time an individual operation is scheduled, and may be called many times to get a single operation scheduled. A technology-independent (Boolean) optimization step 114 follows. A technology mapping step 116 maps the abstract Boolean gates of the circuit to standard cells from a technology library, for example. A placement step 118 locates the gates on the chip real estate, and a routing step 120 interconnects them with wires.

The timing analysis starts with a state diagram, a collection of resources, a technology library, and at least partially scheduled and allocated operations. It determines whether a design as a whole meets its timing requirements. The total delays of such circuit must be such that valid data can be latched into destination registers at the end of each clock cycle. A scheduling system can be used to construct realistic schedules, and result in allocated circuits that have a good probability of meeting timing after layout.

Timing questions must be answered quickly and efficiently, because they will be asked many times in the course of scheduling a single design. For example, in a list-scheduling algorithm, the transitions of the design are considered individually, and in order. For each transition, a set of "ready" operations is constructed. The ready operations are those with input data that is available in the source state of the transition. One of these operations is selected using some criterion, e.g., most urgent first, and is removed from the ready list and assigned to a resource that is otherwise unused in the current transition. Its result data is then added to the set of data that is available. Other operations that depend on its results may then be added to the ready list. Such process continues until no more operations are in the ready list, or there are no more resources available to perform the operations on the ready list, or the operations on the ready list cannot be scheduled on the current transition. This repeats until all of the arcs have been considered and all of the operations have been scheduled. The timing process stops if the design cannot be scheduled using a given resource set.

Timing analysis must be done each time an individual operation is scheduled. If a first candidate operation-transition-resource scheduling tuple is not accepted, the timing analysis procedure must be called repeatedly until one is accepted. The timing analysis procedure must be able to evaluate the timing for all of the resources of a design each time a scheduling tuple for an operation is considered.

Furthermore, the timing analysis must be bit-true, as opposed to bitwise-lumped. When characterizing the delays of the various resources, a single number or a single load/delay function associated with each resource is inadequate. A delay or load/delay function must be associated with each output bit of a resource.

A fast, accurate, bit-level timing model for a combinational resource can be constructed because a graph representing combinational logic can always be partitioned into a collection of trees. A logic tree uses its nodes to represent gates and terminals, and its arcs represent connections. Electrical drivers are always below the gates they drive in a logic tree, e.g. farther from the root, or else it is the root of the tree and the gates it drives are in another tree. The terminals of a tree represent its connections to gates outside the logic tree. When a gate in the network has a fan-out of two or more, the root of a maximal logic tree is the output terminal of such gate. All other trees become subtrees.

Figure 2:
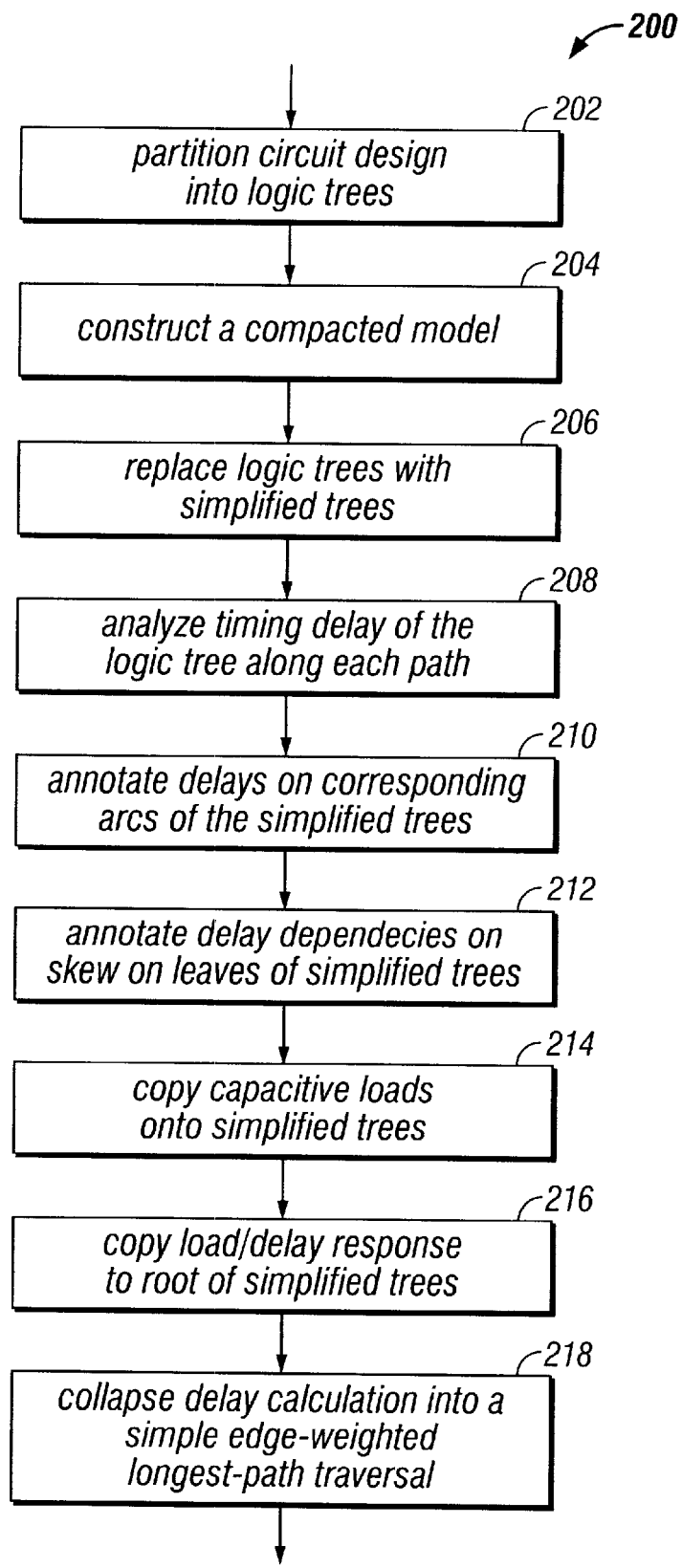
FIG. 2 is a flowchart diagram of a timing analysis method embodiment of the present invention.

FIG. 2 represents a timing analysis method of the present invention, and is referred to herein by the general reference numeral 200. The method 200 begins with a step 202 that partitions a circuit design into its corresponding logic trees. Once a circuit that has been partitioned into logic trees, it becomes possible to construct a compacted model 204 of the circuit by replacing the logic trees with equivalent trees having no interior nodes, e.g., as in a step 206. These equivalent trees are often substantially simpler than the original trees. In a step 208, the timing in the original circuit is analyzed along each path from a tree leaf to its root. A propagation delay calculated for each path. In a step 210, such computed delays are annotated onto the corresponding arcs of the simplified trees. In a step 212, any dependency of a propagation delay of the original circuit on the slew rate of the input signal is annotated onto the corresponding leaf of the simplified tree. A step 214 copies capacitive loads from the leaves of the logic tree to the leaves of the simplified tree. The load/delay response curve of the output gate, e.g., at the apex of the logic tree, is copied in a step 216 to the root of the simplified tree.

Figure 3A:
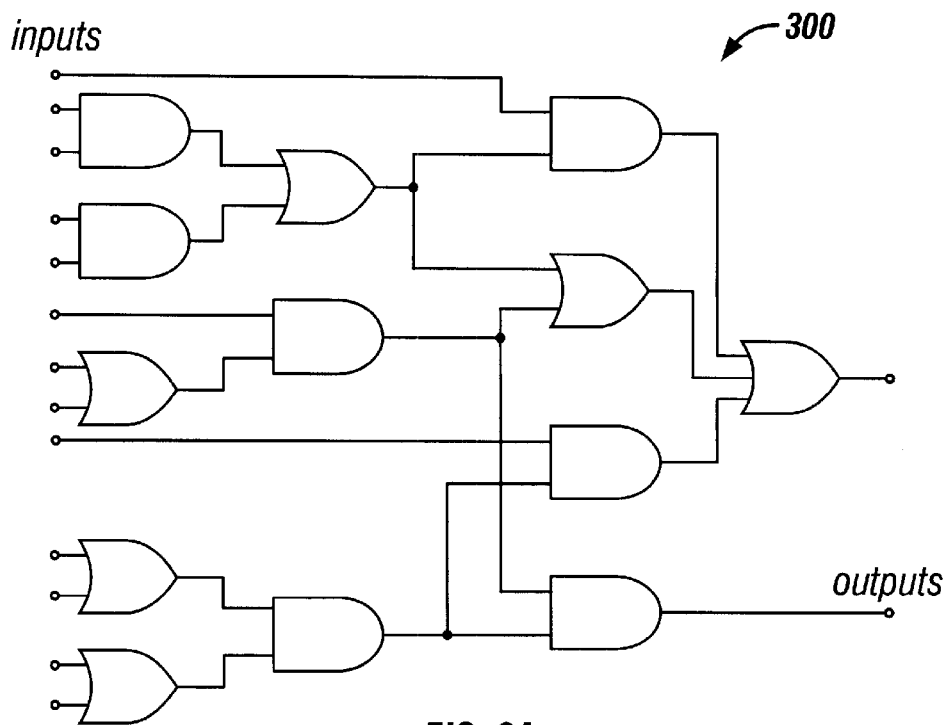
FIGS. 3A, 3B, and 3C, are diagrams that represent the transitions from a circuit, to a logic tree, and a simplified tree.
Figure 3B:
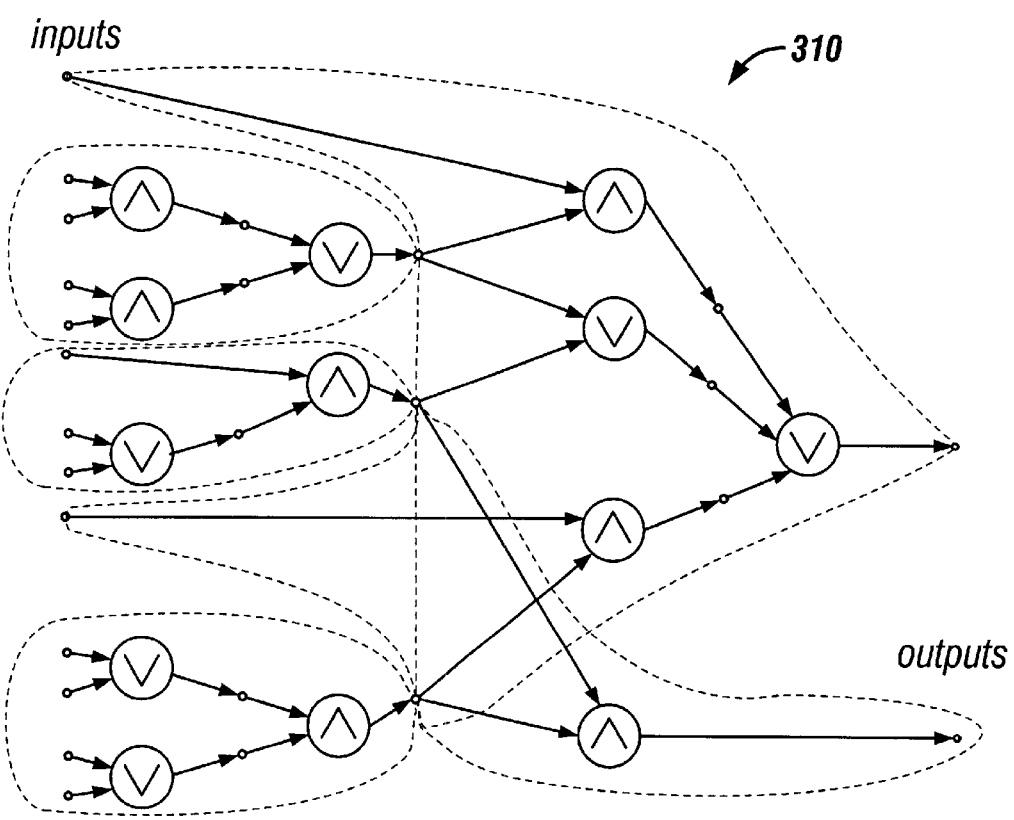
Figure 3C:
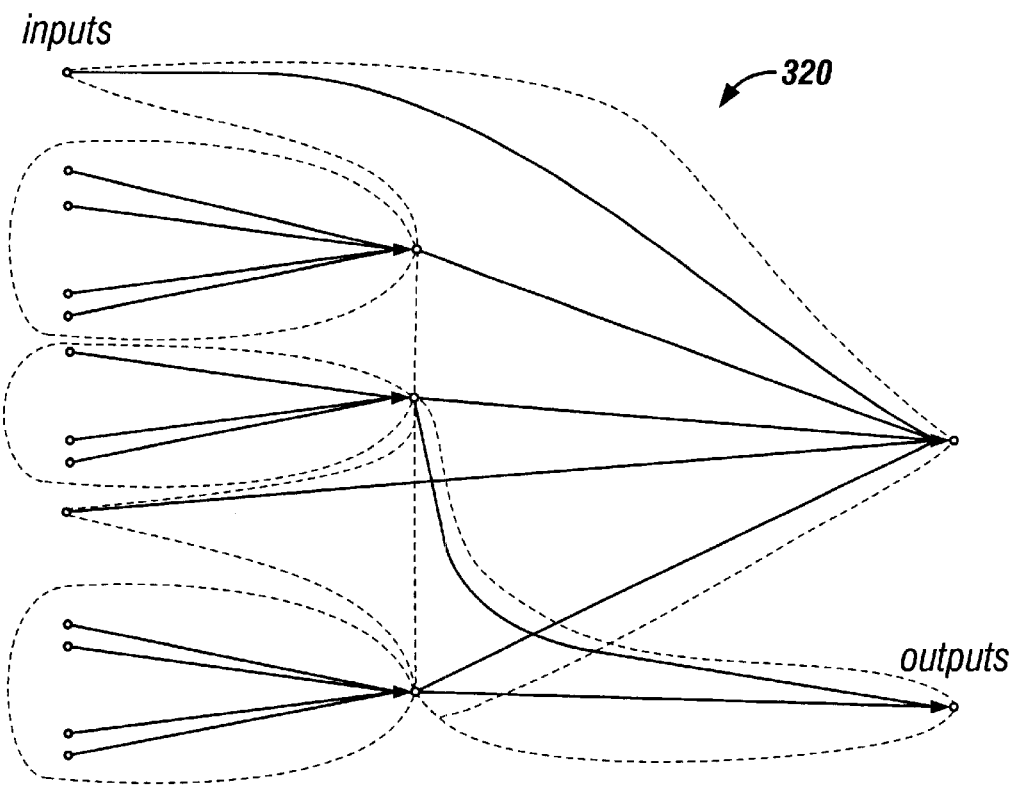

FIGS. 3A, 3B, and 3C, represent the transitions from a circuit 300, to a logic tree 310, and a simplified tree 320. In FIG. 3B, the logic gates are represented as nodes in the tree. The AND-gates have a pointed-up chevron symbol, and the NOR-gates have the down-pointed chevron. In FIG. 3C, the nodes are eliminated entirely. In subsequent steps in embodiments of the present invention, the simplified tree 320 is decorated with annotations that provide quick answers about delay issues in circuit 300 (FIG. 3A). The dotted envelopes show the subtrees.

Some edge effects like slew and load dependency might be subsumed into the path delays in embodiments of the present invention. But these additional terms only need to be computed for trees with terminals on a boundary of an entire resource. In a step 220, the entire delay calculation thus collapses into a simple edge-weighted longest-path traversal within the interior of an abstract timing model of a resource. This enables much faster timing analysis compared to computing slew rates and delays for each cell of a circuit.

Figure 4:
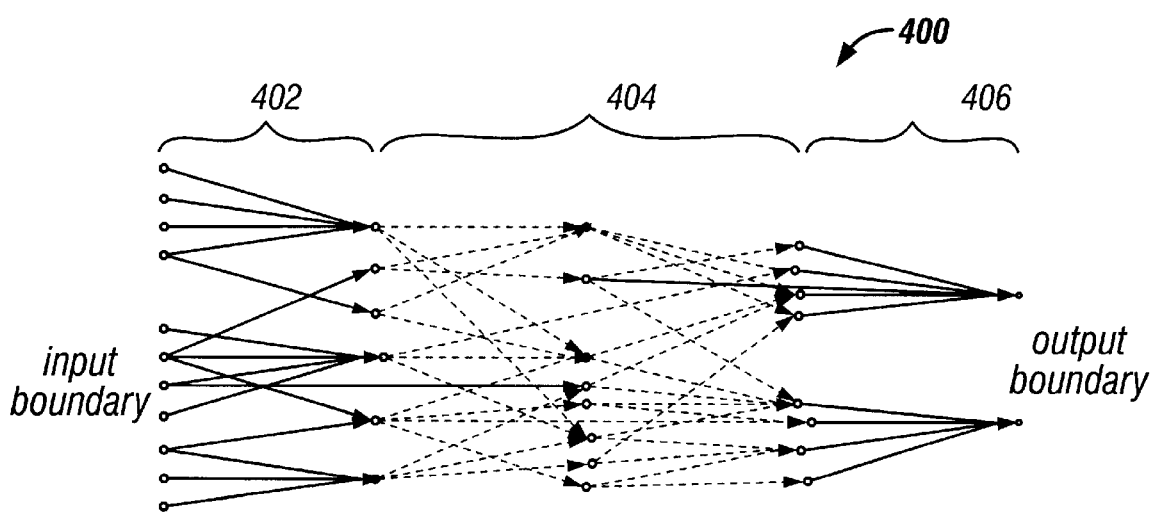
FIG. 4 is a diagram representing a design that comprises a set of complex-model arcs at the input boundary, a set of simplified-model arcs inside, and another set of complex-model arcs at the output boundary.

FIG. 4 represents a design 400 that comprises a set of complex-model arcs 402 at the input boundary, a set of simplified-model arcs 404 inside, and another set of complex-model arcs 406 at the output boundary. There may be some loss of accuracy associated with such use of a simplified model of propagation delay in the interior of a model, but in practice these inaccuracies appear to be insubstantial. If a loss of accuracy is an issue, the more complex models can be used on additional interior arcs. The accuracy would be increased, but so would the solution's run time. Only arcs touching circuit boundaries really need complex models. Arcs having simplified models are shown with dashed arrows.

When all of the logic trees representing a circuit have been mapped to simplified trees, the original resource circuit diagram can be discarded. All of the relevant timing information will be preserved in the network of simplified trees. It then becomes possible to analyze the timing of chained resources by using models of resources that are encapsulated in networks of simplified trees together with a graph-traversal algorithm that calculates arrival times. The simplified-model timing analysis graph traversals can enable an order of magnitude faster analysis than conventional methods.

Although the present invention is described herein with reference to the preferred embodiment, one skilled in the art will readily appreciate that other applications may be substituted for those set forth herein without departing from the spirit and scope of the present invention. Accordingly, the present invention should only be limited by the Claims included below.

What is claimed is:

1. A design-timing-determination process in an electronic design automation system, comprising the steps of:

partitioning an original circuit design into a set of corresponding logic trees replacing each said logic tree with an equivalent simplified tree having no interior nodes;

analyzing each path from a tree leaf to its root in said original circuit;

computing a propagation delay for each said path;

annotating computed delays onto corresponding arcs of said simplified trees; and collapsing an entire delay calculation into a simple edge-weighted longest-path traversal within an interior of an abstract timing model of a resource.

2. The method of claim 1, comprising the further steps of:

annotating any dependency of a propagation delay of said original circuit design on a slew rate of an input signal onto a corresponding leaf of said simplified tree.

3. The method of claim 1, comprising the further steps of:

calculating timing delays for an electronic design with a combination of complex-model trees that interface circuit boundaries and simple-model trees that are internal and do not interface with circuit boundaries.

* * * * *